(12) United States Patent
Dunn

(10) Patent No.: US 7,889,927 B2
(45) Date of Patent: Feb. 15, 2011

(54) CHINESE CHARACTER SEARCH METHOD AND APPARATUS THEREOF

(76) Inventor: Roger Dunn, 2480 Pali Hwy., Honolulu, HI (US) 96817

( * ) Notice: Subject to any disclaimer, the term of this patent is extended or adjusted under 35 U.S.C. 154(b) by 1172 days.

(21) Appl. No.: 11/366,548

(22) Filed: Mar. 3, 2006

(65) Prior Publication Data

US 2006/0204100 A1   Sep. 14, 2006

Related U.S. Application Data

(60) Provisional application No. 60/661,029, filed on Mar. 14, 2005.

(51) Int. Cl.
 *G06K 9/18* (2006.01)
(52) U.S. Cl. .................... 382/185; 382/182; 382/183; 382/186; 382/187
(58) Field of Classification Search ............. 382/185, 382/183, 182, 186, 187
See application file for complete search history.

(56) References Cited

U.S. PATENT DOCUMENTS

| | | | |
|---|---|---|---|
| 4,670,841 A | 6/1987 | Kostopoulos | |
| 5,319,552 A | 6/1994 | Zhong | |
| 5,586,198 A | 12/1996 | Lakritz | |
| 5,812,697 A * | 9/1998 | Sakai et al. | 382/186 |
| 5,903,861 A | 5/1999 | Chan | |
| 6,005,549 A | 12/1999 | Forest | |
| 6,496,275 B1 * | 12/2002 | Kurashina et al. | 358/1.11 |
| 6,922,811 B1 | 7/2005 | Leung et al. | |
| 7,256,769 B2 * | 8/2007 | Pun et al. | 345/171 |
| 7,319,950 B2 | 1/2008 | Liu | |

OTHER PUBLICATIONS

Harbaugh, R.; "Learn Chinese Characters"; http://www.zhongwen.com/; Oct. 21, 2009.

* cited by examiner

*Primary Examiner*—Bhavesh M Mehta
*Assistant Examiner*—Mike Rahmjoo
(74) *Attorney, Agent, or Firm*—Rosenberg, Klein & Lee

(57) ABSTRACT

The present invention provides a Chinese character search method. According to the method, the user first inputs the notation of the known character. When the input notation is received, some corresponding Chinese characters are shown in the display. Then, the user chooses the correct character for which he is searching. Next, symbols are added to this character to represent the unknown Chinese character in the word. Then, those words containing this character are searched and are shown in a display.

10 Claims, 2 Drawing Sheets

CHINESE CHARACTER SEARCH METHOD AND APPARATUS THEREOF

CROSS-REFERENCE TO RELATED APPLICATION

This application claims the priority benefit of U.S. Provisional Application Ser. No. 60/661,029, filed Mar. 14, 2005, the full disclosures of which are incorporated herein by reference.

FIELD OF THE INVENTION

The present invention relates to a method for processing Chinese characters, and more particularly to a method of searching for Chinese characters.

BACKGROUND OF THE INVENTION

The Chinese language is represented by Chinese characters. Several types of notation are used to indicate the pronunciation of a Chinese character. Typical examples include the Pin Yin notation issued in 1958 by the government of People's Republic of China and "bopomofo" notation used before 1958 and still currently used in Taiwan.

Along with the rapid popularization of Chinese culture, especially in countries where Chinese characters are not used, numerous Chinese character search methods have been developed. To date, the existing search methods still have the following problems:

Generally, Pin Yin, bopomofo or radical indexing is adapted to find Chinese characters in the existing search methods. In other words, these search methods require that a user input exact Pin Yin notation, bopomofo notation or the radical of the character. No search method exists for a situation where a user does not already know the pronunciation or radical of a Chinese character.

Furthermore, a Chinese character may be written irregularly. A novice has great difficulty to pronounce exactly a character with irregular notation. Even if a user can read a Chinese character with regular notation, nothing is found if the irregular notation is input for a search because the existing search methods only function if an exact notation is used to find the meaning of a character.

Therefore, in the relationship between the existing search methods and the search results, only one correspondence relationship, notation or radical, is implemented; more powerful and more intelligent search methods have not been adapted to make searching more practical for a novice. In other words, the existing search methods and the search results require a high correlation. Therefore, for a Chinese character novice, higher practicality cannot be achieved and various users' requirements cannot be widely satisfied.

SUMMARY OF THE INVENTION

The main purpose of the present invention is to provide a search method that uses a part of a Chinese character to find the whole Chinese character.

Another purpose of the present invention is to provide a search method that uses one Chinese character of a word to find a whole word.

According to the main aspect, if the user recognizes one of the characters in a word, the user inputs the notation of the known character. When the input notation is received, some corresponding Chinese characters are shown in the display. Then, the user chooses the correct character for which he is searching. Next, symbols are added to this character to represent the unknown Chinese character in the word. Then, those words containing this character are searched and are shown in a display.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Reference will now be made in detail to a specific embodiment of the invention. An example of the specific embodiment is illustrated in the accompanying drawings. While the invention will be described in conjunction with a specific embodiment, it will be understood that it is not intended to limit the invention to one specific embodiment. To the contrary, it is intended to cover alternatives, modifications, and equivalents as may be included within the spirit and scope of the invention as defined by the appended claims.

Figure 1:
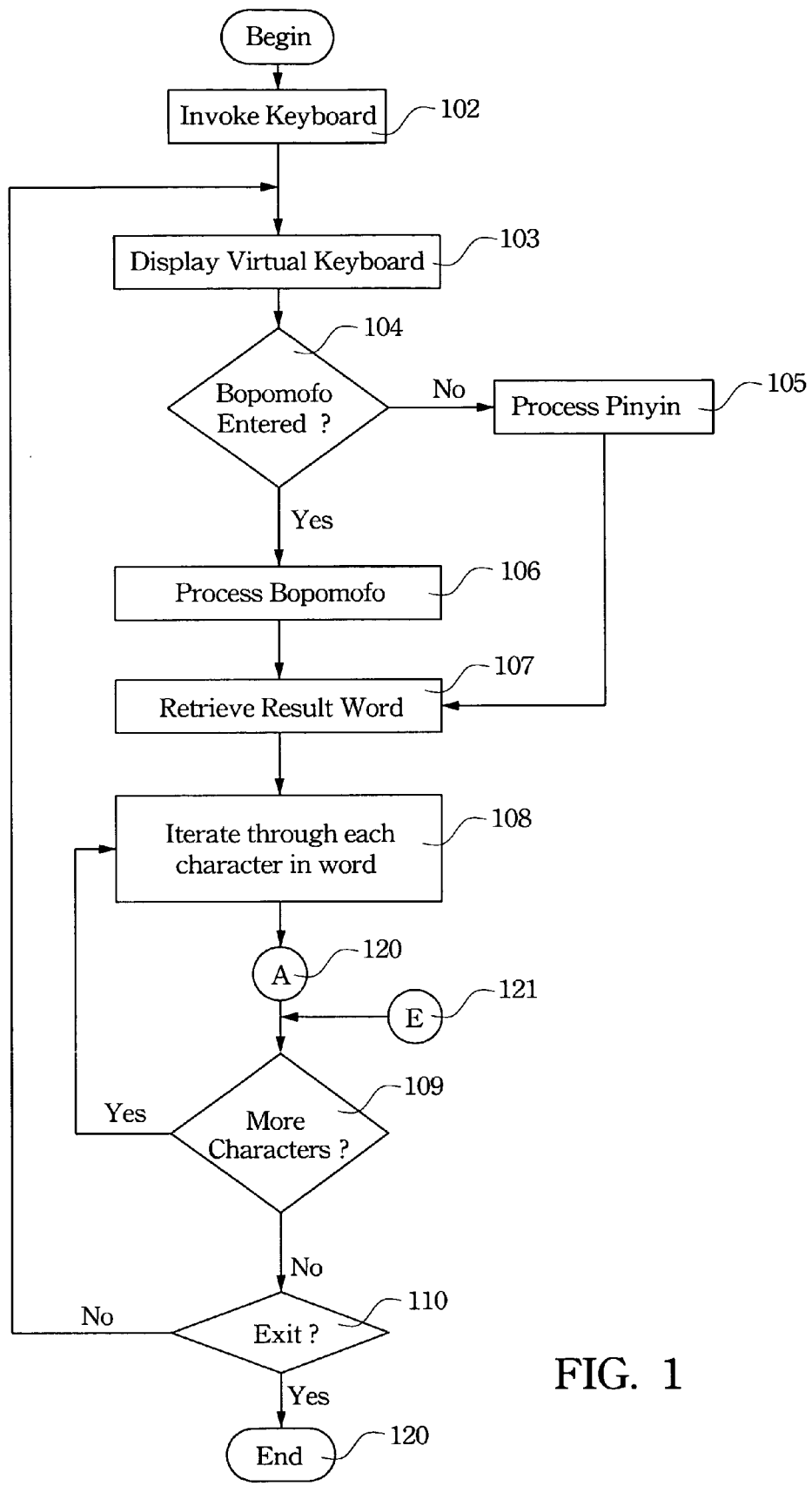
FIG. 1 and FIG. 2 are the flow chart of the searching method according to the present invention.

FIG. 1 is a flow chart describing searching for Chinese characters according to the present invention.

When starting to search for Chinese characters, the user first requires a keyboard for inputting into a computer program stored on a non-transitory computer readable memory medium, a pronunciation in step 102. According to the preferred embodiment of the present invention, a virtual keyboard is used for inputting the pronunciation when searching for Chinese characters in step 103. The virtual keyboard comprises Pin Yin keys for inputting a pronunciation using the Pin Yin notation and bopomofo keys for inputting a pronunciation using the bopomofo notation. Therefore, step 104 requires that a user select either the Pin Yin notation or the bopomofo notation input mode. If the user selects the Pin Yin notation mode, step 105 is performed; if the user selects the bopomofo notation mode, step 106 is performed.

When users use Pin Yin keys (step 105) or bopomofo keys (step 106) to input a pronunciation for searching for Chinese characters, related Chinese characters are retrieved in step 107. Then, in step 108, all unknown characters of this word can be searched by using the method illustrated in the FIG. 2 in step 120. Additionally, in step 121, if the user skips a character, step 109 is performed to check whether or not more characters are required to find this word. If more Characters are required, step 108 is performed again to enter the flow chart shown in FIG. 2. If no more characters are required, this flow chart asks the user if another search is desired in step 110. If the user wants to continue to searching for another Chinese character, steps 103 to 109 are performed again. If the user does not wish to continue searching, the flow chart ends in step 112.

Figure 2:
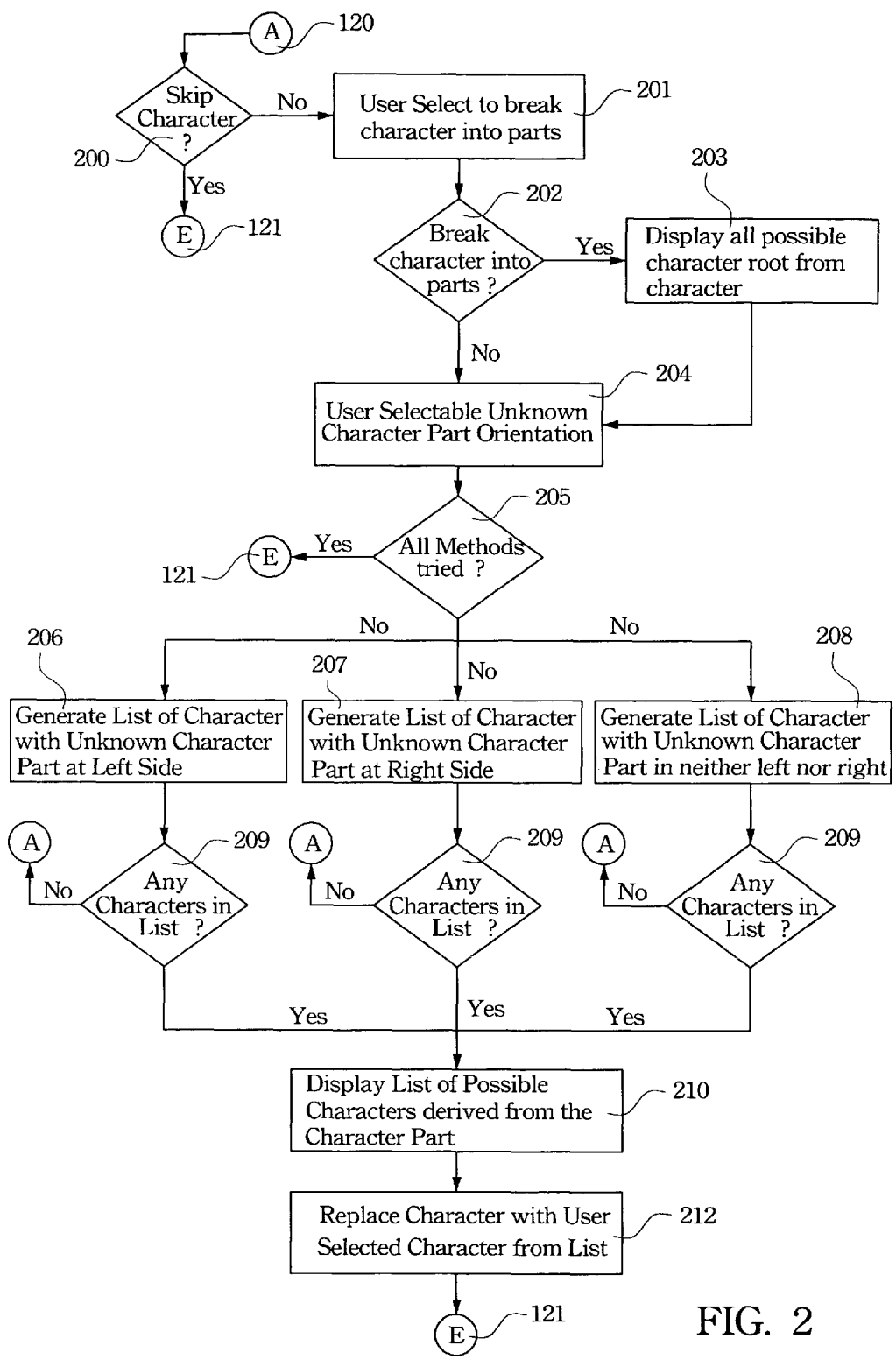

FIG. 2 illustrates a flow chart of using parts of a character to search a for a whole character according to the present invention.

When a character is found through the flow chart in FIG. 1, the user can determine whether or not to perform a further search. In other words, if this character is not known to the user, the user can use the search flow in the FIG. 2 to perform a further search. Therefore, step 200 is a determination step for a user to determine whether or not to perform a further searching. If the users decides to skip a character, step 109 in FIG. 1 is performed again; otherwise step 201 is performed. The present invention uses parts of a character to find a required character in step 201.

When a user wants to break a character in step 202, all possible character roots (parts) for this character are automatically displayed in a display in step 203. The users may find the required character from these roots when the required character is a part of this character. For example, the user wants to search for the Chinese character, "豆". The users know the Chinese character, "頭". At this time, the user can find the Chinese character, "頭" first according to the flow chart 1. Then, the users can break this character, "頭", as described in step 202; all possible character roots, "豆"and "頁", are automatically displayed in a display in step 203. Finally, The users can find the Chinese character, "豆". In another example, the user wants to search for the Chinese character, "奴". The users know the Chinese character, "努". At this time, the user can find the Chinese character, "努" first according to the flow chart 1. Then, the users can break this character, "努", as described in step 202; all possible character roots, "奴" and "力", are automatically displayed in a display in step 203. Finally, The users can find the Chinese character, "奴". In other examples, according to the present invention, the users can use the Chinese character, "懶", to find the related Chinese character, "賴". Or, the users can use the Chinese character, "機", to find the related Chinese character, "幾".

On the other hand, the users can select one correct character root from all possible character roots to find other Chinese Characters. Then, in step 204, the user must indicate the unknown part orientation in this character. The present invention also allows searching for a character from a special part. In other words, if the user knows part of an unknown character, they only need to indicate the unknown part orientation in this character in step 204.

For example, the user wants to search for the Chinese characters, "徒". The users can break this character, "徒", as described in step in step 202; all possible character roots, "走" and "彳", are automatically displayed in a display in step 203. On the other hand, in step 204, the user can use a special part, such as "走", to find the character, "徒", in step 206 because the left part of "徒" is unknown. In this case, a symbol, such as a dollar sign, is used to represent the unknown part, such that the input is "$走". Next, the present invention provides three methods, step 206, 207 and 208, to find the character. After trying these three methods, this character still can not be found. In step 205, the searching will be ended and go back to step 121 in FIG. 1 again. In another example, the user wants to search for the Chinese characters, "題". The users can break this character, "題", as described in step in step 202; all possible character roots, "是" and "頁", are automatically displayed in a display in step 203. On the other hand, in step 204, the user can use a special part, such as "是", to find the character, "題", in step 207 because the right part of "題" is unknown. In this case, a symbol, such as a dollar sign, is used to represent the unknown part, such that the input is "是$". In other examples, according to the present invention, the users can use the Chinese character, "不", to find the related Chinese character, "杯". Or, the users can use the Chinese character, "及", to find the related Chinese character, "級", and so on.

On the other hand, the present invention also can use a similar Chinese character to find a required Chinese character. For example, the user wants to search for the Chinese characters, "磕". However, the users do not know the pronunciation of any part of the "磕". In this present invention, the users may use a known Chinese character that has a part of the Chinese characters, "磕", to find this "磕". For example, the users know the Chinese character "蓋" that has a part, "盍", is same as the Chinese characters, "磕". In this embodiment, the users input the PinYin notation "gai4" of the known Chinese character "蓋" in step 105, related Chinese characters are retrieved in step 107. The uses may select the required Chinese character "蓋". Next, The users can break this character, "蓋", as described in step in step 202; all possible character roots, "盍" and "艹", are automatically displayed in a display in step 203. At this time, the users can use the part, "盍", to find the character, "磕", in step 206 because the left part of "磕" is unknown. In this case, a symbol, such as a dollar sign, is used to represent the unknown part, such that the input is "$盍". Next, in step 206, all characters that has a right part of "盍" are displayed in a display to the users. The users can select the required Chinese characters, "磕". In other example, the users may use the foregoing solution, from a more recognizable character, "樸", to find its part "業", then to find the required Chinese character, "撲". In another example, the users also may from a more recognizable character, "趕", to find its part "早", then to find the required Chinese character, "捍".

When the Chinese character to be found is composed of two or more character roots, related search results are displayed in steps 206, 207 or 208 according to the unknown part orientation indicated in step 204. For example, when the unknown part orientation indicated in step 204 is on the left side, all characters with an unknown part on the left side are generated in step 206. When the unknown part orientation indicated in step 204 is on the right side, all characters with an unknown part on the right side are generated in step 207. When the unknown part orientation indicated in step 204 is on the upside or downside, all characters with an unknown part in neither left nor right sides are generated in step 208.

Next, a determination step 209 is performed to determine whether or not any character is generated in step 206, 207 or 208. If no character is generated from the foregoing search flow, step 120 is performed again to use another unknown part to repeat the foregoing search flow. If the list of characters with unknown part is generated, step 210 displays this list of possible characters derived from this unknown part. Then, in step 212, the user selecting character is used to replace the character of the result word shown in step 107 in FIG. 1. Then, step 121 is performed again to check whether or not another character search is required.

The user must know the correct notation or radical of Chinese characters in the conventional Chinese character search methods. However, a novice has great difficulty to know exactly the notation or radical of Chinese characters. Therefore, the present invention provides a new search method that can find a character from parts thereof even though this part is not the radical thereof. According to the method, a sortable table is provided that stores data including each Chinese character radical and components, frequency of use, Pin Yin notation, bopomofo notation, and irregular notation. The user inputs the notation of the known part of the character from an input apparatus. The processor searches the sortable table so as to find characters with the part having the same notation. Then, the search result is shown in a display.

On the other hand, the present invention can reach a real time translation destination. For example, the Chinese characters "摩天輪" means Ferris wheel. A person can just write down the phrase, "Do you like to ride 摩天輪", on the screen. The present invention automatically translates this word to "Do you like to ride Ferris wheels", and displays this on the screen. In other words, it is not necessary for the users to first skip to a search screen and then perform a search process to find the English translation of the Chinese characters "摩天輪". Then, the users go back to the original screen again to write down the words, "Do you like to ride Ferris wheels". Therefore, the present invention is convenient for writing.

As is understood by a person skilled in the art, the foregoing preferred embodiments of the present invention are illustrative of the present invention rather than limiting of the present invention. It is intended that this description cover various modifications and similar arrangements included within the spirit and scope of the appended claims, the scope of which should be accorded the broadest interpretation so as to encompass all such modifications and similar structure.

What is claimed is:

1. A Chinese Character search method for selecting a desired Chinese character from a plurality of pre-stored Chinese characters based upon incomplete identification of the desired Chinese character, comprising:
   (a) inputting a notation corresponding to a known reference Chinese character containing at least a first component part in common with said desired Chinese character;
   (b) searching the pre-stored Chinese characters based on the notation to find said known reference Chinese character;
   (c) breaking said known reference Chinese character into a plurality of component parts that comprise said first component part and displaying said component parts; and
   (d) selecting at least said first component part and then searching again the pre-stored Chinese characters based on at least said first component part to find at least one candidate for selecting the desired Chinese character from the plurality of pre-stored Chinese characters based upon the incomplete identification of the desired Chinese character.

2. The method according to claim 1, wherein said notation is Pin Yin notation.

3. The method according to claim 1, wherein said notation is bopomofo notation.

4. The method according to claim 1, wherein the step (d) further comprises using a predetermined symbol to represent an unidentified portion of said desired Chinese character.

5. The method according to claim 1, further comprising displaying a plurality of candidate Characters including said first component part.

6. The method according to claim 1, wherein the step (d) further comprises generating a list of candidate characters containing said first component part at a right side relative to an unidentified portion of said desired Chinese character.

7. The method according to claim 1, wherein the step (d) further comprises generating a list of candidate characters containing said first component part at a left side relative to an unidentified portion of said desired Chinese character.

8. The method according to claim 1, wherein the step (d) further comprises generating a list of candidate characters containing said first component part at a top side of, bottom side of, or around an unidentified portion of said desired Chinese character.

9. A non-transitory computer readable memory medium encoded with a computer executable program to implement a method for selecting a desired Chinese character from a plurality of pre-stored Chinese characters based upon incomplete identification of the desired Chinese character, comprising:
   (a) inputting a notation corresponding to a known reference Chinese character containing at least a first component part in common with said desired Chinese character;
   (b) searching the pre-stored Chinese characters based on the notation to find said known reference Chinese character;
   (c) breaking said known reference Chinese character into a plurality of component parts that comprise said first component part and displaying said component parts; and
   (d) selecting at least said first component part and then searching again the pre-stored Chinese characters based on at least said first component part to find at least one candidate for selecting the desired Chinese character from the plurality of pre-stored Chinese characters based upon the incomplete identification of the desired Chinese character.

10. The non-transitory computer readable memory medium encoded with a computer executable program to implement a method for selecting a desired Chinese character from a plurality of pre-stored Chinese characters based upon incomplete identification of the desired Chinese character, according to claim 9, wherein the step (d) further comprises generating a list of candidate characters containing said first component part at a user specified location of said desired Chinese character.

* * * * *